April 7, 1925.  W. E. WEAVER  1,532,166
SPRING WHEEL
Filed March 14, 1924
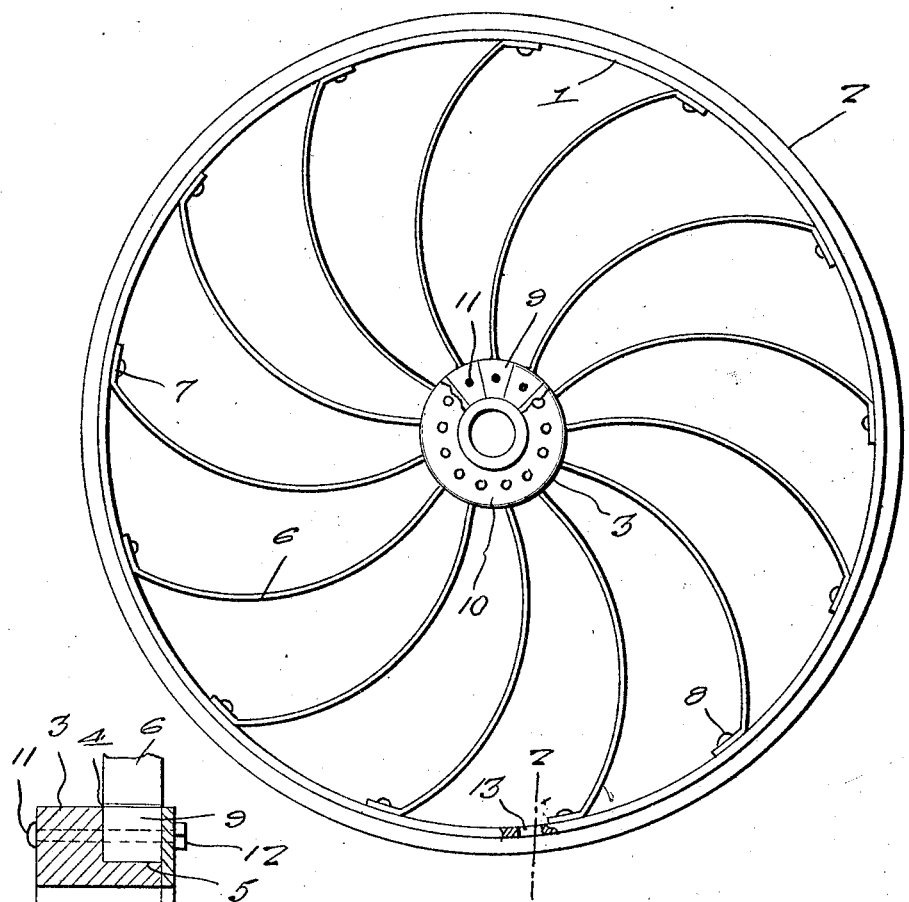
Fig. 1.
Fig. 3.
Fig. 2.
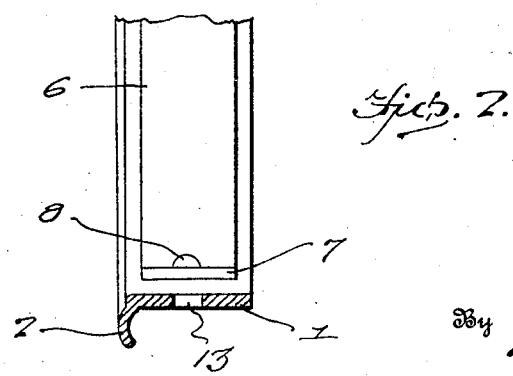
Inventor
W. E. Weaver
By
Attorney Patented Apr. 7, 1925.

1,532,166

UNITED STATES PATENT OFFICE.

WALTER E. WEAVER, OF NACOGDOCHES, TEXAS.

SPRING WHEEL.

Application filed March 14, 1924. Serial No. 699,286.

*To all whom it may concern:*

Be it known that I, WALTER E. WEAVER, a citizen of the United States, residing at Nacogdoches, in the county of Nacogdoches and State of Texas, have invented certain new and useful Improvements in Spring Wheels, of which the following is a specification.

This invention relates to new and useful improvements in spring wheels and has for its principal object to provide a wheel having the characteristics of a wheel equipped with a pneumatic tire, however eliminating the objectionable features such as punctures or blow-outs to which said pneumatic tires are now subjected.

A further object of the invention is to provide a spring wheel wherein the vehicle upon which the same are mounted will ride more easily and will withstand the shocks to which the same is subjected when travelling over a rough road.

A further object of the invention is to provide a spring wheel of the above mentioned character whereby the road shocks usually imparted to the rear axle and the differential carried thereby will be taken up by the spring wheels mounted on the ends of the axle.

A further object of the invention is to provide a spring wheel of the above mentioned character, which is of such construction as to enable either a solid tire or a pneumatic tire to be associated therewith, the use of the spring wheel in connection with a pneumatic tire being to add to the more comfortable riding in a vehicle upon which the wheels are mounted.

A further object of the invention is to provide a spring wheel of the above mentioned character, which is simple in construction, inexpensive, strong and durable and further, well adapted for the purposes for which it is designated.

Other objects and advantages of this invention will become apparent during the course of the following description.

In the accompanying drawing forming a part of this specification, and in which like numerals designate like parts throughout the same, Figure 1 is a side elevation of my improved spring wheel, Figure 2 is a sectional view taken on line 2—2 of Figure 1, and Figure 3 is a fragmentary sectional view of the hub showing the manner in which the inner ends of the spokes are adapted to be supported therein.

In the drawing wherein for the purpose of illustration is shown the preferred embodiment of my invention, the numeral 1 designates a continuous rim which is provided with the usual flange 2 for the purpose of supporting thereon a tire either of a solid construction or of the pneumatic type, as is desired. The hub of my spring wheel is designated by the numeral 3 and the same is cut away as at 4 to provide an annular pocket 5, the latter being arranged adjacent the front face of the hub in the manner as clearly illustrated in Figure 3 of the drawing. The purpose of this construction will be hereinafter more fully described.

Adapted to be disposed between the continuous rim 1 and the hub 3, are the curved spring spokes 6 each of which are formed of spring steel or the like and are preferably in the form of a flat band as is clearly shown in Figure 2. The outer ends of the curved spring spokes 6 are disposed outwardly as shown at 7 in the drawing, and in contact with the inner periphery of the rim 1; any suitable fastening means such as is shown at 8 in the drawing may connect the same to the rim 1. The inner ends of the spokes 6 are adapted to extend into the annular pocket 5 provided in the periphery of the hub 3, and each of the spring spokes has its inner end provided with the enlarged tapering portion 9, the purpose of which will be presently apparent.

In placing the curved spring spokes 6 in position on the spring wheel, the inner enlarged ends of the spokes are inserted laterally into the annular pocket 5 so that the tapered portions formed on the inner extremities thereof will fit in the annular pocket 5 formed in the hub and each tapered portion of each of the spokes will abut adjacent tapered portions of the adjacent spokes, so that when all of the spokes are in position on the hub, the tapered portions will abut one another and thereby prevent any relative movement of the same within the pocket in the hub. For the purpose of holding the tapered portions of the curved spring spokes in the pocket 5 against lateral displacement, I provide the face-plate 10 on the front face of the hub 3 and in the face plate there is formed or provided a series of spaced apertures which are adapted to register with the apertures provided in the tapered portions of the spokes whereby any suitable fastening means such as is shown at 11 in the drawing may extend through the hub and through the openings provided in the tapered portions of the spokes and the face plate 10. A suitable nut such as is shown at 12 in the drawing is threaded on each of the ends of the fastening bolts 11 for holding the plate in position on the hub.

For the purpose of using the spring wheel in connection with a pneumatic tire, the rim 1 may be provided with a suitable opening such as is shown at 13 to permit the passage therethrough of the usual valve stem of the inner tube mounted in the pneumatic tire whereby access to the valve may be had without having to remove the tire from the wheel. However, a solid tire may also be supported on the rim and when a solid tire is used, the curved spokes will provide the necessary resiliency as heretofore obtained by the use of pneumatic tires, and will eliminate any of the objectionable features such as punctures and blow-outs which frequently occur when pneumatic tires are used.

The simplicity in which my spring wheel is constructed enables the same to be readily assembled and does not require the use of any complicated tools in order to remove any of the spokes from the wheel whenever necessary. By further providing a spring wheel of the above mentioned character, a vehicle equipped with such wheels will ride more easily over a rough road and the occupants of the vehicle will at all times be comfortable.

While I have shown the preferred embodiment of my invention, it is to be understood that various changes in the size, shape and arrangement of parts may be resorted to without departing from the spirit of the invention and the scope of the appended claim.

Having thus described my invention what I claim is:—

A spring wheel of the class described comprising a continuous rim having a flat peripheral portion provided on one edge with a tire engaging flange, a hub embodying an annular groove forming a pocket on one side thereof, a plurality of longitudinally bowed spring spokes interposed between the rim and hub, said spokes being provided on their inner ends with wedge-shaped enlargements forming heads for reception in said pocket, said heads being disposed in abutting relation, a face plate closing said pocket on one side, said plate, heads, and hub being formed with aligned bolt holes, bolts passing through said holes for retaining the plate, heads and hub in assembled relation, the outer ends of said spokes being bent at an angle and bearing against the flat peripheral portion of said rim, and fastenings for securing said angularly bent ends to the rim, the points of anchorage of the outer ends of the spokes being shifted circumferentially, so that each spoke has its outer end anchored at a point out of radial alignment with respect to the hub connection.

In testimony whereof I affix my signature.

WALTER E. WEAVER